US012586602B2

(12) United States Patent
Spiller et al.

(10) Patent No.: US 12,586,602 B2
(45) Date of Patent: Mar. 24, 2026

(54) ERASING OF DATA FROM TAPES

(71) Applicant: Insurgo Holdings Limited, Abertillery (GB)

(72) Inventors: Roy Spiller, Treorchy (GB); Gavin Griffiths, Llwydcoed (GB)

(73) Assignee: Insurgo Holdings Limited, Abertillery (GB)

( * ) Notice: Subject to any disclaimer, the term of this patent is extended or adjusted under 35 U.S.C. 154(b) by 0 days.

(21) Appl. No.: 18/991,339

(22) Filed: Dec. 20, 2024

(65) Prior Publication Data

US 2026/0024549 A1    Jan. 22, 2026

(30) Foreign Application Priority Data

Jul. 22, 2024    (GB) ...................................... 2410671

(51) Int. Cl.
*G11B 5/024*        (2006.01)
*G11B 5/008*        (2006.01)

(52) U.S. Cl.
CPC .......... *G11B 5/024* (2013.01); *G11B 5/00813* (2013.01)

(58) Field of Classification Search
None
See application file for complete search history.

(56) References Cited

U.S. PATENT DOCUMENTS

| | | | | |
|---|---|---|---|---|
| 2005/0099718 A1* | 5/2005 | Takano | .................. | G11B 5/024 |
| 2006/0220859 A1* | 10/2006 | Nagai | ........................ | B41J 3/50 |
| | | | | 340/572.1 |
| 2008/0003043 A1* | 1/2008 | Fukui | .................... | B41J 15/044 |
| | | | | 400/615.2 |
| 2019/0095353 A1* | 3/2019 | Hoerger | ............... | H04L 9/0872 |
| 2021/0012174 A1* | 1/2021 | Ono | .................. | G11B 5/00813 |
| 2021/0012804 A1* | 1/2021 | Nakashio | ............... | G11B 23/30 |
| 2021/0241793 A1* | 8/2021 | Anno | ................... | G11B 23/027 |

FOREIGN PATENT DOCUMENTS

JP        H0822499 A    *   1/1996

OTHER PUBLICATIONS

English text of Nakamura et al., JP H0822499 A (Year: 1996).*

* cited by examiner

*Primary Examiner* — Peter Vincent Agustin
(74) *Attorney, Agent, or Firm* — Jackson Walker LLP

(57)        ABSTRACT

The present invention provides a system for the erasure of data from a tape cartridge having a data tape and a CM chip, the device comprising: a controller in communication with: a magnetic head; a tape driver; and an antenna, wherein, when a data cartridge is detected by the controller, the controller is operable to signal to the antenna to determine the CM chip identification data; and, the controller is operable in dependence on the received CM chip identification data to instruct the antenna to overwrite at least a portion of the non-protected memory of the CM chip.

11 Claims, 2 Drawing Sheets

ERASING OF DATA FROM TAPES

CROSS-REFERENCES TO RELATED APPLICATIONS

The present application claims priority under 35 U.S.C. § 119 to Application No. GB 2410671.8 filed Jul. 22, 2024, which is fully incorporated by reference herein.

TECHNICAL FIELD

The present invention relates to the erasing of data from magnetic data tapes. In particular, the present invention relates to the erasing of data from magnetic data tapes and their CM (Cartridge Memory) chip.

BACKGROUND OF THE INVENTION

Magnetic tapes provide a compact, economical means of preserving and reproducing a large amount of data. For example, the most predominantly used half inch tapes provide hundreds of data tracks. In addition, the tape includes what is known as a 'servo' track. This is a magnetic frequency strip installed on the full length of each tape and the intention of the servo track is to keep the drive head in line with the data tracks that it is writing to, during use.

Inside each modern data tape is a built-in CM chip which records metadata about the tape, such as the type of encoding, the size of the storage capacity, access data and other potentially sensitive information. The data on the CM chip is passively read by external devices. The actual data carrying chip of the CM is about 1 mm squared and only a couple of microns thick. Further, the data on the CM chip cannot be assured to be impacted via a shredder and even if it is exposure to a degaussing field, the data still resides as it needs a microwavable frequency, or an additional method to treat/impact.

Typically, the data recorded on the data tape is confidential in nature and therefore, when this data is no longer required, the tapes cannot simply be discarded as normal waste. Although it is possible to erase the data on the data tape, and re-use, this is only practical when the data tape is being reused within the same commercial environment, as it is not possible to erase the data on the associated CM chip. Alternatively, the data tape can be destroyed and either sent to landfill or incinerated. However, due to data protection requirements and commercial confidentiality considerations, it is more secure to erase the data on the tapes prior to the disposal of the tapes rather than relying on simple disposal into landfill as being sufficient to protect the privacy of the data, or relying on confidentiality being maintained prior to incineration. Further, both forms of disposal are unsustainable and environmentally undesirable and lead to destruction of materials which could be recycled.

However, data erasure prior to destruction is problematic. To remove recorded data from a data tape, it is necessary to apply a strong magnetic field to the tape—this is known in the industry as 'degaussing' and sometimes doesn't remove all the recorded data. However, even if the data on the data tape is erased, the data on the CM chip of the tape is not affected. Further, in view of the size and location of the CM chip within the tape cartridge, it is not possible to simply remove the CM chip for separate destruction prior to recycling of the tape cartridge materials.

If the tape cartridge is to be re-used in it's original commercial environment, it may be possible to reuse the data cartridge after erasure of the data on the tape, as the confidentiality of the potentially commercially sensitive data on the CM chip is not an issue. However, it becomes problematic if the tape is to be destroyed.

Further, as the CM chip is integral to the case, the CM chip cannot be removed from the tape cartridge prior to destruction in fear of tampering/traceability of data, and therefore the potentially recyclable materials of the cartridge must all be destroyed by incineration merely in order to ensure the destruction of the CM chip data, and avoid compromise of the confidentiality of the commercially sensitive information the CM chip contains.

There is therefore a need for an improved system of data erasure that destroys both the data on the magnetic tape and the data on the CM chip, to allow recycling of the plastics in the tape cartridge without compromising the confidential information held on the CM chip.

SUMMARY OF THE INVENTION

The present invention seeks to address the problems of the prior art.

Aspects of the present invention are set out in the attached claims.

Accordingly, a first aspect of the present invention provides a system for the erasure of data from a tape cartridge having a data tape with electronic identification data, the system comprising: a controller in communication with: a magnetic head; a tape driver; and an antenna; wherein, when a data cartridge is detected by the controller, the controller is operable to signal to the antenna to determine the electronic identification data; and, the controller is operable in dependence on the determined electronic identification data to instruct the antenna to overwrite at least a portion of the electronic identification data.

The electronic identification data may comprise data held on a CM chip, or an RF chip or any other suitable device located in, with or in association with the tape cartridge.

A further aspect of the present invention provides a system for the erasure of data from a tape cartridge having a data tape and a CM chip, the system comprising: a controller in communication with: a magnetic head; a tape driver; and an antenna; wherein, when a data cartridge is detected by the controller, the controller is operable to signal to the antenna to determine the CM chip identification data; and wherein the controller is operable in dependence on the determined CM chip identification data to instruct the antenna to overwrite at least a portion of the non-protected memory of the CM chip.

It is to be appreciated that the CM chip identification data may comprise the original tape cartridge serial number and/or barcode associated with the tape cartridge, or any other suitable identification data provided to identify the tape cartridge and facilitate tracking of the tap cartridge.

In one embodiment, the controller is operable, in dependence upon the CM chip identification data, to instruct the tape driver to drive the data tape from the tape cartridge across the magnetic head to delete the data on the data tape.

The use of a magnetic head comprising a soft iron surface will ensure the deletion of all tracks on the tape, including the servo tracks, thereby ensuring full data removal and rendering the tape cartridge unable to be re-used for the recordal of further data.

In a further embodiment, the controller is operable to access predetermined tape cartridge identification data set; and wherein, prior to instructing the antenna to overwrite at least a portion of the non-protected memory of the CM chip, the controller is operable to determine if the CM chip identification data is present in the predetermined tape cartridge identification data set.

The predetermined data set may comprise, for example, a list of serial numbers or bar code data identifying cartridge tapes to be processed for data erasure.

In one embodiment, if the CM chip identification data is present in the predetermined tape cartridge identification data set, the controller is operable to instruct the antenna to overwrite at least a portion of the non-protected memory of the CM chip.

Thus, data erasure will only proceed for those tape cartridges which are positively identified for data erasure processing.

In a further embodiment, if the CM chip identification data is not present in the predetermined tape cartridge identification data set, the controller is operable to instruct the tape driver to reject the tape and no instruction is provided to the antenna to overwrite any portion of the non-protected memory of the CM.

Thus, the accidental erasure of data from a tape cartridge not intended for the data erasure process is prevented, as the tape cartridge is rejected, for example by ejection from the system, before the erase process proceeds.

In a further embodiment, wherein in dependence upon the CM chip identification data, the controller is operable to instruct the antenna to overwrite substantially all of the non-protected memory of the CM chip in dependence upon the CM chip identification data.

Thus, where the CM chip identification data positively identifies the tape cartridge is intended to be processed for data deletion, the CM chip identification data may be overwritten to identify that the data deletion process has commenced and/or has been completed, thereby allowing onward tracking of the tape cartridge and its status with respect to data deletion.

In one embodiment, the antenna overwrites the non-protected memory of the CM chip with formatted identification data.

This replaces any previously present data in the non-protected memory of the CM chip with replacement data which could optionally include tracking data relating to the data erase process, such as, but not limited to, the time, place, operative, system ID, data erasure process, tracking data and the like.

In a further embodiment, wherein when the data has been erased from the data tape, the controller is operable to instruct the antenna to alter the CM chip identification data.

The altered chip identification data may comprise proprietary software, thereby allowing confidential tracking and interrogation of the tape cartridge status under controlled conditions where authorised access to the proprietary formatted identification data is authorised. This provides an additional level of security when tracking tape cartridges and their status with respect to data deletion.

Preferably, when data has been erased from the data tape, the controller is operable to instruct the antenna to write a status identification indicator to the non-protected memory of the CM chip. The status identification indicator may comprise a bar code or serial number.

In one embodiment, the magnetic head comprises a fixed neodymium earth magnet. However, it is to be appreciated that any other magnetic head known to the skilled person and suitable for the function of full erasure of data from the magnetic tape may be used in addition to or as an alternative to a fixed neodymium earth magnet.

4

Figure 2:
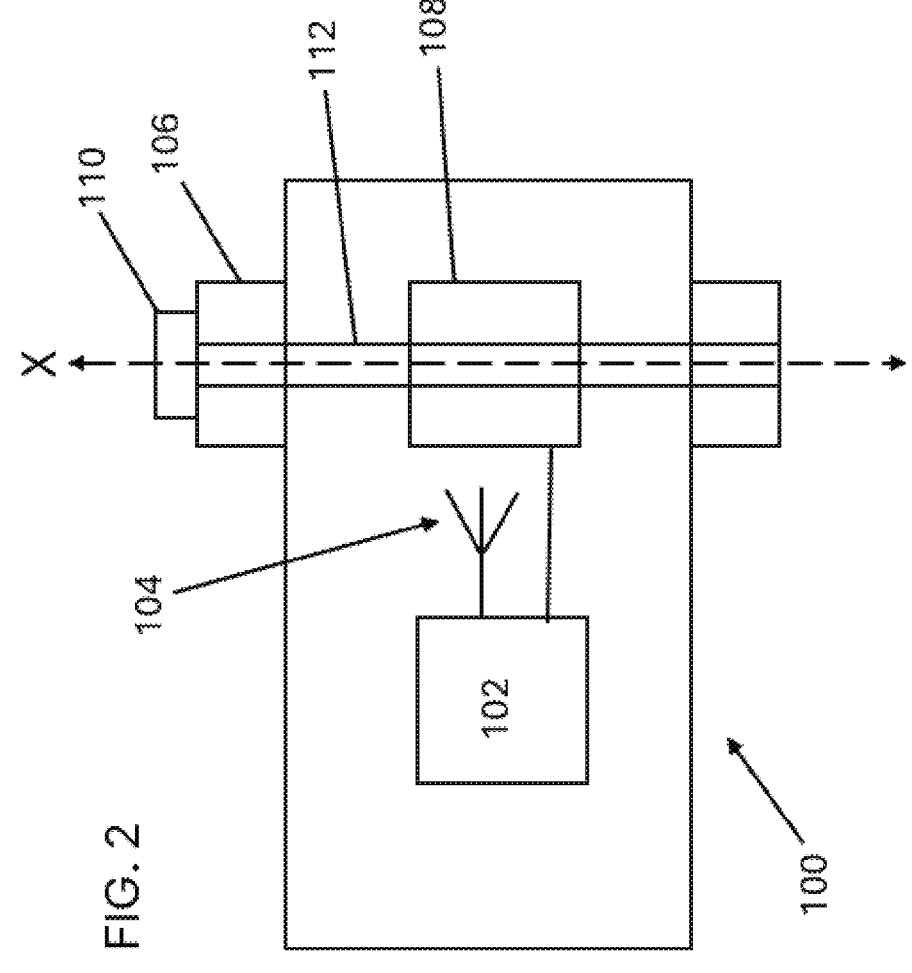

FIG. 2 is an illustration of a first embodiment of a system in a accordance with the present invention.

DETAILED DESCRIPTION OF THE PREFERRED EMBODIMENTS

Figure 1:
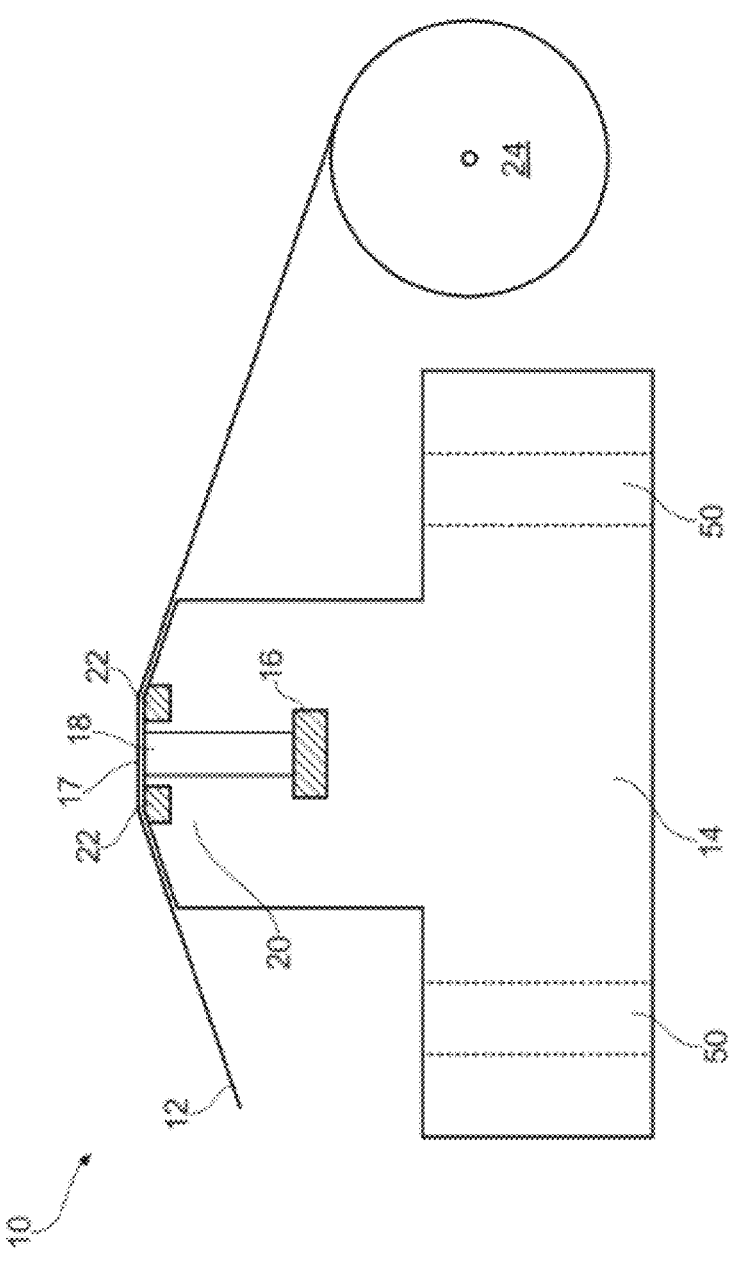
FIG. 1 shows an example of a prior art device for the erasure of data from the data tapes of a tape cartridge.

FIG. 1 shows a prior art magnetic head for erasing data from the data tape of a tape cartridge, and as described in UK patent GB2557564. FIG. 1 shows a magnetic head 10 for erasing data on a magnetic tape 12, the magnetic head 10 comprising a body 14 and a magnet 16 mounted on the body and located beneath a plurality of magnetisable portions 18. Magnet 16 is elongate in form and the plurality of magnetisable portions 18 are aligned with one another and located above the elongate magnet 16. The magnetisable portions 18 are embedded in a brass bed 20 that extends the length of the magnet 16 located below, to form a planar surface 17 over which the tape 12 is passed during the erasing process.

Mounting holes 50 are provided to allow the magnetic head 10 to be mounted in position A ceramic edging 22 is provided on either side of the brass bed 20 and extends along the length of the brass bed 20.

In the embodiment shown, the magnet comprises Neodymium N52. Data tape 12 is driven over the magnetic head 10 by tape drive 24.

In use, a tape 14 is engaged with tape drive 24. Tape drive 24 is operated to drive tape 14 over the aligned magnetisable portions 18 of erasing surface 17. As there is a single magnet 16 magnetically charging the aligned magnetisable portions 18, there is a consistent magnetic field strength across erasing surface 17. Accurate passing of tape 14 over magnetisable portions 18 ensures that accurate and complete erasure of date from tape 14 is achieved During the erasure process, one single head of approximately 2.5 cm in width is sufficient to erase the data on a standard tape of half an inch in width. However, it is to be appreciated that alternative head widths and tape width combinations may be contemplated It is to be noted that the magnetic head described above is an example of a prior art device and illustrates the concept of erasure of data from a data tape.

In the magnetic head of the prior art, strategic gaps are provided between the magnetisable elements in order to safeguard the servo tracks of the tape and thereby allow it to be erased and subsequently re-used. However, in the magnetic head of the present invention, no such gaps are provided. Instead, a soft iron surface without gaps is presented to the magnetic tape during the erasing process.

An embodiment of a system 100 in accordance with the present invention is illustrated in FIG. 2. System 100 comprises controller 102 in communication with antenna 104. Magnetic head 108 is aligned with tape driver 106 along axis X. During use, a tape cartridge 110 is engaged with system 100 and tape driver 106 is operable, on command from the controller 102, to drive data tape 112 in a direction aligned with axis X across magnetic head 108.

The method of operation of system 100 is described below:

Step 1: Data cartridge 110 is engaged with system 100;

Step 2: On detection of the tape cartridge 110, controller 102 is operable to communicate with tape driver 106 to engage with the data tape 112;

Step 3: The controller 102 is operable to communicate with antenna 104 and command antenna 104 to interrogate the CM chip (not shown) of data tape 110 to determine the Chip identification data. This will allow the determination of whether that specific data tape 112 is destined for destruction or erasure or neither.

Step 4: If the data tape 112 is destined for destruction, the system 100 moves to step 5. Alternatively, if data tape 112 is not destined for destruction, the system 100 ejects the tape cartridge 110 from system 100 and the process is terminated Step 5: On receipt of confirmation that the data tape 112 is destined for destruction, the tape driver 106 is operable, on command from the controller 102, to drive the data tape 112 in a direction aligned with axis X across magnetic head 108 to erase the data on the data tape 112. Once data tape 112 has been fully passed over magnetic head 108, the tape driver 106 is operable to drive the data tape 112 in the reverse direction to return the data tape 112 to tape cartridge 110.

Step 6: Destruction of the Data on the CM Chip—This step occurs after either step 4 or step 5. Once the data tape 112 has passed across the magnetic head 108 to erase the data from data tape 112, the controller 102 instructs the antenna 104 to destroy the data on the CM chip. This is discussed in more detail below.

Step 7: On detection of the deletion of the CM chip data by antenna 104, controller 102 drives the antenna 104 to write the data status to the CM chip (not shown) in a custom structure to allow continued tracking of the tape cartridge 110 despite the previous destruction of the data on the CM chip.

Step 8: On completion of step 7, the controller logs the process as complete, the tape cartridge 110 is ejected from the system 100, and the process is terminated. The successful erasure of the data tape 112 and CM chip, and subsequently writing of new status data to the CM chip, is notified to a user via a user interface, such as a digital display, light indicator array, verbal announcement or any other suitable notification means known to the skilled person.

On completion of the above process, the tape cartridge 110 may be disassembled, the recyclable materials separated and processed for re-use, and the remaining materials forwarded for incineration or landfill.

Step 6: Destruction of the Data on the CM Chip

Each CM chip contains read-only and read/write sections to store tape-specific information. As part of the stored data, there are two types of memory: protected and unprotected. Protected memory contains tables where read-only data is stored i.e. chip serial number, manufacturer information etc. Unprotected memory contains tables where read/write data is stored i.e. data which is updated during use of the data tape 112. This includes some identifying information such as previous identification data that has been attributed to the data tape 112, tape flags and other data that is changed during tape use.

When controller 102 instructs the antenna 104 to destroy the data on the CM chip, antenna 102 writes to every non-protected memory in the CM chip with erroneous non-meaningful data, thereby destroying the unprotected page tables and all stored usage information.

On completion of this, the controller then drives the antenna to write a new serial number and erasure date to the CM chip in a proprietary format understood by the system of the present invention, so that continued tracking of the tape cartridge 102 can take place.

This provides a reliable means of ensuring that a tape cartridge 102, and thus both the associated data tape 112 and CM chip, have undergone complete data destruction using the system of the present application.

This accountability is important when establishing a legal trail evidencing destruction of confidentiality of sensitive information.

Further, the system of the present invention allows the tape cartridge 102 to be disassembled and the recyclable materials processed for re-use and the remaining materials destroyed by incineration, thus significantly reducing the conventional landfill or incineration waste experienced with conventional tape cartridge disposal methods in which the CM chip data is not erased.

What is claimed is:

1. A system for the erasure of data from a tape cartridge comprising a data tape and identification data, the system comprising: a controller in communication with: a magnetic head; a tape driver; and an antenna;
   wherein the tape cartridge comprises a data tape and a CM chip and wherein the identification data is held on the CM chip; and
   wherein, when the data cartridge is detected by the controller, the controller is operable to signal to the antenna to determine the CM chip identification data; and wherein the controller is operable in dependence on the CM chip identification data to instruct the antenna to overwrite at least a portion of the non-protected memory of the CM chip.

2. A system as claimed in claim 1, wherein the controller is operable, in dependence upon the CM chip identification data, to instruct the tape driver to drive the data tape from the tape cartridge across the magnetic head to delete the data on the data tape.

3. A system as claimed in claim 1, wherein the controller is operable to access predetermined tape cartridge identification data set; and wherein, prior to instructing the antenna to overwrite at least a portion of the non-protected memory of the CM chip, the controller is operable to determine if the CM chip identification data is present in the predetermined tape cartridge identification data set.

4. A system as claimed in claim 3, wherein if the CM chip identification data is present in the predetermined tape cartridge identification data set, the controller is operable to instruct the antenna to overwrite at least a portion of the non-protected memory of the CM chip.

5. A system as claimed in claim 3, wherein if the CM chip identification data is not present in the predetermined tape cartridge identification data set, the controller is operable to instruct the tape driver to reject the tape and no instruction is provided to the antenna to overwrite any portion of the non-protected memory of the CM.

6. A system as claimed in claim 1, wherein in dependence upon the CM chip identification data, the controller is operable to instruct the antenna to overwrite substantially all of the non-protected memory of the CM chip in dependence upon the CM chip identification data.

7. A system as claimed in claim 1, wherein the antenna overwrites the non-protected memory of the CM chip with formatted identification data.

8. A system as claimed in claim 1, wherein when the data has been erased from the data tape, the controller is operable to instruct the antenna to alter the CM chip identification data.

9. A system as claimed in claim 8, wherein when data has been erased from the data tape, the controller is operable to instruct the antenna to write a status identification indicator to the non-protected memory of the CM chip.

10. A system as claimed in claim 9, wherein the status identification indicator comprises a bar code or serial number.

11. A system as claimed in claim 1, wherein the magnetic head comprises a fixed neodymium earth magnet.

* * * * *